Patented Sept. 30, 1947

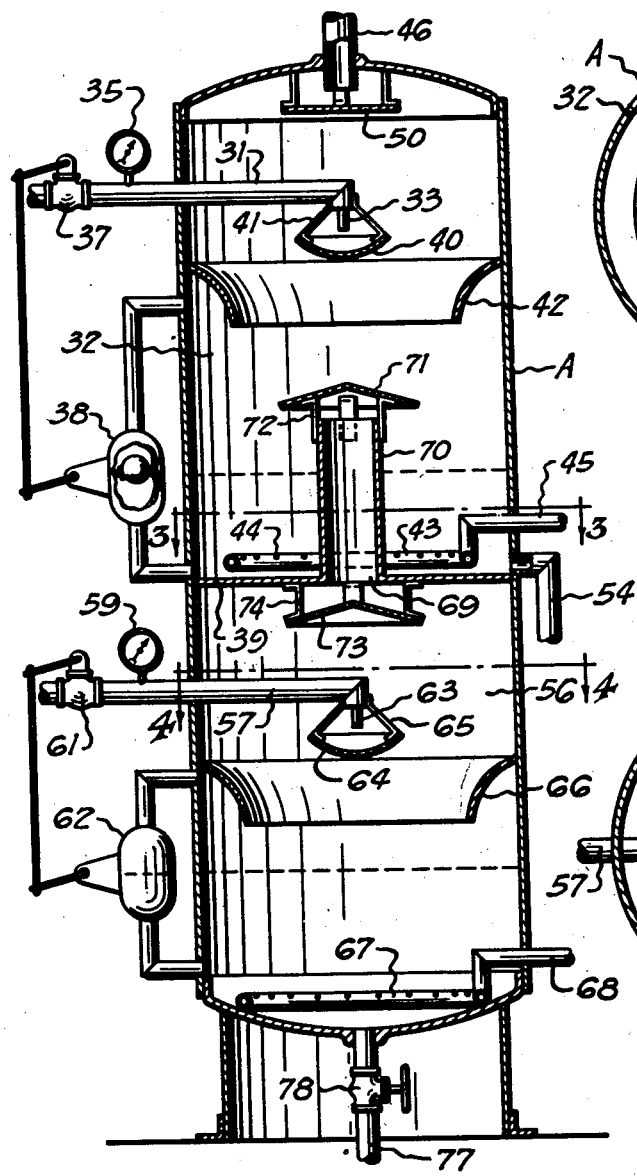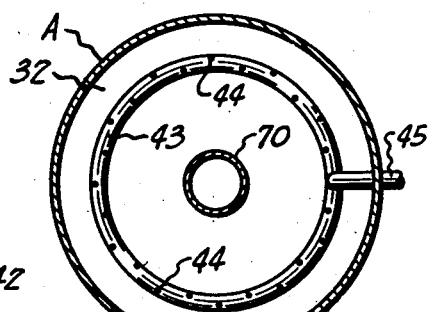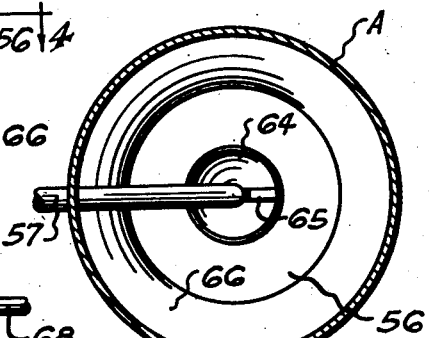

2,428,082

UNITED STATES PATENT OFFICE 2,428,082

OIL BLEACHING PROCESS AND APPARATUS

Robert R. King, Samuel E. Pack, and Floyd W. Wharton, Sherman, Tex., assignors, by mesne assignments, to Mrs. Tucker's Foods, Incorporated, a corporation of Delaware Application November 10, 1941, Serial No. 418,528

15 Claims. (Cl. 260—428)

This invention relates to new and useful improvements in methods of and means for treating oils.

In the art of refining and treating oils, it is well-known that the use of adsorbents, such as clays and carbons, in granular or pulverized form, is particularly advantageous and beneficial to decolorization. Although granular or coarse mesh adsorbents are suitable for the so-called percolation methods of treatment, the so-called contact methods of treatment require a pulverized or finely divided adsorbent. In the latter method, a predetermined quantity of adsorbent, such as clay, bauxite or other suitable material, is admixed with the untreated oil and is then agitated or stirred at an elevated temperature to bring about an intimate contact between the particles of said oil and adsorbent. After this step, the mixture is forced through a filter press to remove the solids as well as the impurities from the oil. There are broadly two types of contact treatment methods, one being the individual batch treatment and the other consisting of continuously flowing oil through an apparatus wherein a proportionate quantity of adsorbent is continuously fed to the oil at the beginning of the operation. Both the batch and continuous treatments are employed by the petroleum oil industry, while substantially all of the vegetable or fatty oil refineries are of the batch type.

It has been found that the exclusion of atmospheric oxygen from the contacting zone of either the batch or continuous method is of marked benefit to the oil because at elevated temperatures exposure of said oil to oxygen causes undue oxidation, resulting in gum formation and the development of new color bodies in the oil, as well as damage to the flavor and stability in the case of delicate edible oils. Thus, it is generally preferable to bring about an intimate contact between the oil and adsorbent under a vacuum so as to assure the absence of oxygen. However, the presence of minute quantities of moisture in the oil and/or adsorbent during this contacting step has been found to be desirable, because the same increases or improves decolorization, although the moisture content is maintained below a predetermined percentage by dehydration. Heretofore, the removal of excessive moisture as well as oxygen and other highly volatile substances has been accomplished by deaerating the oil-adsorbent mixture during the contacting step which includes steam stripping. However, it has been found that simultaneous deaeration and contacting has certain disadvantages, in that the removal of the moisture, oxygen and other highly volatile substances is not sufficiently rapid, whereby contacting will commence prior to adequate deaeration. This premature contacting of the oil and adsorbent prevents the ready coagulation of soaps and other hydratable colloids and the admixing of the same with said adsorbent so as to be subsequently removed therewith because said substances have not been thoroughly dehydrated and deaerated.

Therefore, one object of the invention is to provide an improved method of treating oil which includes the step of deaerating and steam stripping the oil-adsorbent mixture at a low or normal temperature prior to contacting the same at an elevated temperature, whereby the rapid dissipation or flashing off of the entrained moisture, oxygen and other highly volatile substances is accomplished and the ready adsorption of soaps and other hydratable colloids is permitted.

An important object of the invention is to provide an improved method of continuously treating oil without interruption of the oil flow which includes admixing a suitable adsorbent with the oil to be treated, passing the mixture through a preliminary low temperature deaerating and dehydrating step to remove undesirable substances which are gaseous or readily become gaseous under reduced pressures, then passing the mixture at an elevated temperature into a contacting zone to bring about an intimate contact between the oil and the adsorbent and at the same time further degasify the mixture of volatile substances formed in heating, and then separating the oil from the adsorbent to produce a treated oil of improved quality, color, and of marked stability.

Another object of the invention is to provide an improved continuous oil treating method, of the character described, wherein the oil-adsorbent mixture is atomized during deaeration to facilitate or augment the rapid flashing off of undesirable substances prior to the intimate contacting or commingling of the oil and adsorbent at an elevated temperature, whereby an improved quality of oil having less color and odor is produced and whereby a smaller quantity of adsorbent may be employed due to the improved decolorizing action thereof.

A particular object of the invention is to provide an improved oil treating method, of the character described, wherein the usual increase of free fatty acids, which impair the quality of the oil and which distill off during deodorization, is obviated irrespective of the quantity or kind of adsorbent employed, temperature or other operating variables; this result being primarily due to the preliminary low-temperature flash zone which removes water in the free and/or hydrate form, whereby acid salts, such as aluminum sulphate of acid activated adsorbents, are prevented from co-acting with the hydrate molecules or ions and promoting an objectionable degree of hydrolysis of neutral glycerides or fats, i. e., increase of free fatty acids.

Still another object of the invention is to provide a continuous method, of the character described, which is primarily designed for treating vegetable or fatty oils but which may be readily adapted to the treatment of petroleum oil by merely increasing the temperature during the treatment thereof.

A further object of the invention is to provide an improved method of treating oil which assures the production of substantially soap-free oil and subsequent deodorized products having less foaming characteristics; which eliminates the necessity for using expensive adsorbents, such as activated or acid-treated clays and carbon; or for using excessive amounts of less expensive adsorbents; which permits use of a wide range of bleaching temperatures without injury to the oil; which because of reduced earth usage and more thorough dehydration of soap and other impurities requires lower filtering pressures and less filter capacity; which within relatively wide limits renders the original moisture content of the oil or adsorbent immaterial; which produces an oil of greater purity so as to effect a definite reduction of the cost of catalysts in hydrogenation; which permits a shortened period for deodorization and eliminates the necessity for refining with excessive amounts of caustic soda or other alkali; and which provides an oil of increased stability.

A still further object of the invention is to provide an improved apparatus for continuously treating oil which consists of a mixing tank for admixing an adsorbent and the oil to be treated, a deareating-dehydrating chamber for receiving the mixture from the mixing tank to remove undesirable substances therefrom, an admixing chamber for thoroughly admixing the mixture at an elevated temperature as it is discharged from the first chamber, and filter presses separating the oil from the adsorbent to produce a treated oil of improved quality, color and stability.

The construction designed to carry out the invention will be hereinafter described together with other features of the invention.

The invention will be more readily understood from a reading of the following specification and by reference to the accompanying drawings, illustrating a typical example of apparatus constructed according to the invention, and wherein:

Figure 2 is a transverse, vertical, sectional view of the contacting vessel,

Figure 3 is a horizontal, cross-sectional view, taken on the line 3—3 of Figure 2, and Figure 4 is a horizontal, cross-sectional view, taken on the line 4—4 of Figure 2.

Figure 1:
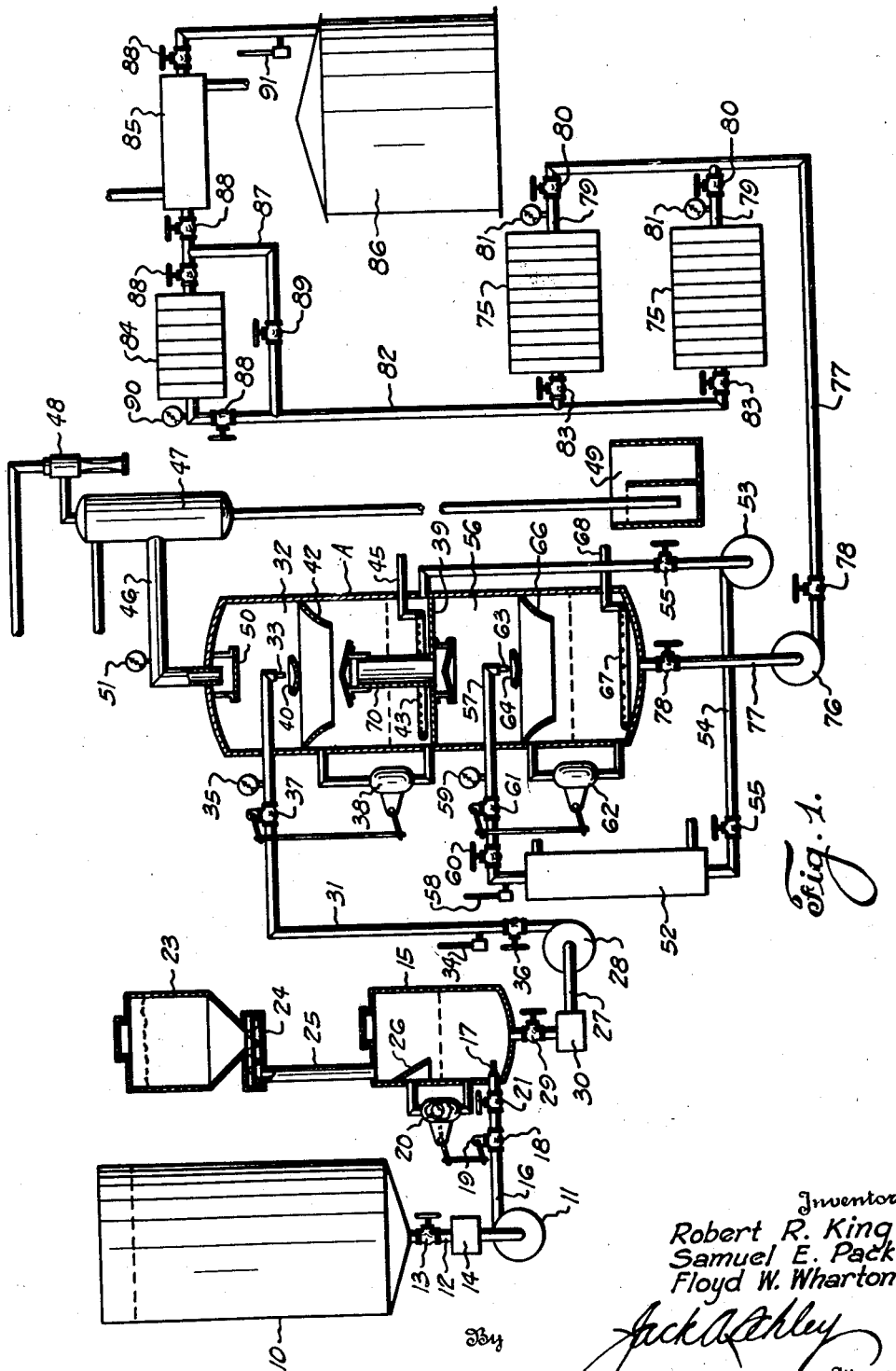
Figure 1 is a schematic flow plan, partially in sectional elevation of a system for carrying out the method in accordance with the invention.

In the drawings, the numeral 10 designates a tank or other suitable container for storing the oil to be treated. The tank is connected to a pump 11, which is preferably of the centrifugal type, by a pipe 12 having a manual control valve 13 and a strainer 14 mounted therein. Communication between the pump and a small mixing tank 15 is established by a conduit 16 which has one end extending through the lower portion of the wall of the tank 15 so as to project into the interior thereof and this end of said conduit carries a nozzle 17, whereby oil pumped from the tank 10 by said pump may be discharged into the lower portion of said tank 15. The flow of oil from the pump into the mixing tank is controlled by a float-actuated control valve 18, the operating stem 19 of the valve being operated by the liquid level control 20 so as to be actuated in accordance with the liquid level within the mixing chamber. A suitable manual control valve 21 is mounted in the conduit 16 between the valve 18 and the nozzle 17.

The adsorbent, such as clay, bauxite, charcoal, bentonite, magnesium silicate or other suitable material, to be admixed with the oil within the tank 15 is confined within a volumetric feeder which is disposed above said mixing tank and which consists of a closed hopper 23 having its lower end communicating with a horizontal screw conveyor 24. A cylindrical chute or duct 25 establishes communication between the conveyor 24 and the upper end of the mixing tank, whereby a proportional quantity of adsorbent may be fed and admixed with the oil in said mixing tank. The provision of a nozzle 17 on the end of the conduit 16 makes it possible to swirl the oil within the mixing tank so as to more thoroughly agitate said oil and mix the same with the adsorbent. For preventing the admitted adsorbent from interfering with the operation of the control 20, a suitable deflector 26 may be secured to the inner surface of the mixing tank and this deflector overlies the upper inlet to the float chamber of said control and directs said adsorbent away from said inlet.

In order to remove the oil-adsorbent mixture from the mixing tank 15, a pipe 27 extends from the bottom of said tank to a centrifugal pump 28 which is similar to the pump 11 and has a manual control valve 29 and a strainer 30 connected therein. The discharge pipe 31 of the pump 28 has its outer end disposed within the upper chamber 32 of a cylindrical vessel A, whereby the mixture removed from the tank 15 may be pumped into said chamber. The outer extremity of the pipe 31 is bent downwardly upon itself at a right angle and has a nozzle 33, similar to the nozzle 17, connected thereto in axial alinement with the chamber 32. A thermometer 34, pressure gauge 35, and control valves 36 and 37 are mounted in the pipe 31 between the pump 28 and tank A, the valve 37 being disposed adjacent said tank and being actuated by the liquid level control 38 of the chamber 32.

As is clearly shown in Figure 2, the pipe 31 is disposed within the upper portion of the chamber 32, which has its bottom formed by a transverse partition 39. A concave or dished deflector 40 is disposed below the nozzle 33 in axial alinement therewith and suspended from the downwardly directed portion of the pipe 31 by depending brackets 41, whereby the mixture discharged from the nozzle will strike or impinge upon the concave surface of the deflector 40 and be deflected or directed upwardly and outwardly in a circular spray so as to atomize said mixture. The extent and duration of this atomization of the mixture is materially increased by the provision of an annular baffle 42 which is secured to the wall of the chamber 32 immediately below the deflector 40. The baffle is curved or arced upwardly and outwardly in cross-section and has its upper marginal edge, which is substantially equal to the diameter of the chamber 32, secured to the wall of said chamber by welding or other suitable means. Obviously, the inwardly and downwardly flared surface of the baffle directs the mixture into the lower portion of the chamber in a circular sheet and also tends to prevent the mixture from entering the upper inlet to the float chamber of the liquid level control 38.

Immediately above the bottom 39 of the chamber 32, an annular tube or pipe ring 43, having perforations 44 formed in its upper surface, is disposed and is connected to a suitable source of low pressure steam (not shown) by an angular pipe 45 which extends through the wall of the vessel A as shown in Figure 3. For deaerating and dehydrating the mixture as it is atomized, a vacuum line 46 projects through the upper end of the vessel A so as to communicate with the chamber 32. The outer end of the line 46 is connected to a barometric condenser 47 of the usual construction which includes a steam ejector 48 and the conventional hotwell 49 and which maintains a suitable vacuum within the chamber 32 during atomization or flashing of the mixture. The pipe 46 may have a pressure gauge 51 mounted therein.

A baffle or deflector 50 depends from the top of the vessel A so as to be axially alined with and overlie the end of the vacuum line 46, which projects into the chamber 32, for preventing the atomized mixture from being drawn into said line. Due to the steam which is ejected from the perforations 44 of the pipe ring 43 and which passes upwardly through the chamber 32 and due to the vacuum which is drawn on said chamber simultaneously with the atomization of the mixture, deaeration and dehydration of said mixture and a consequent rapid dissipation or flashing off of the entrained moisture, oxygen and other highly volatile substances, as well as undesirable odors, is accomplished.

The deaerated, dehydrated mixture is conveyed from the lower end of the chamber 32 by a conductor 54 which has its opposite end connected to a suitable heater 52. A pump 53 is mounted in the conductor 54 for forcing the mixture through the heater. Suitable control valves 55 are mounted in the conductor 54 on each side of said pump 53. After the mixture has been heated to a desired temperature, preferably from 220 to 325 degrees Fahrenheit, or a higher temperature as may be required by the particular oil being treated, the mixture is conducted from the heater 52 to a chamber 56 formed in the lower portion of the vessel A by a pipe 57, which extends through the wall of the vessel A and terminates at the central portion thereof. A thermometer 58, pressure gauge 59, manual control valve 60, and float actuated valve 61 are mounted in the line 57 and are similar to the thermometer 34, pressure gauge 35, and valves 36 and 37 of the pipe 31. The valve 61, of course, forms a part of the liquid level control 62 which is provided for the purpose of maintaining a predetermined liquid level within the lower chamber 56.

A nozzle 63, similar to nozzle 33, is connected in the depending end portion of the line 57 which has a concave or dished deflector 64 suspended therefrom in axial alinement with the nozzle by suitable brackets 65. Immediately below the deflector 64, an annular baffle 66, which is secured to the wall of the chamber 56 and which is similar to the baffle 42 of the chamber 32, is disposed. The nozzle 63, deflector 64, and baffle 66, co-act to atomize the heated mixture which is admitted to the chamber 56 by the line 57 in substantially the same manner as the nozzle 33, deflector 40 and baffle 42 of the chamber 32. For admitting a small quantity of steam to the chamber 56, a perforated annular tube or ring 67, similar to the pipe ring 43 and having connection with a suitable source of low-pressure steam through a pipe 68, is disposed within the lower end of the chamber 56 above the bottom of the vessel A.

As is clearly shown in Figures 2 and 3, the chamber 56 communicates with the chamber 32 by means of an axial opening 69 formed in the partition 39 which serves as a top for the lower chamber, as well as a bottom for the upper chamber. Thus, the vacuum which is drawn upon the chamber 32 by means of the line 46 is also drawn upon the chamber 56. For preventing the passage of the mixture within one chamber to the other chamber, a cylindrical sleeve 70 is secured within the opening 69 so as to project upwardly from the partition 39 and has its upper end terminating above the liquid level of the chamber 32. A conically-flared deflector or hood 71 overlies the upper end of the sleeve 70 and is secured thereto in spaced relation by a plurality of angular brackets 72, whereby the downwardly directed atomized mixture within the chamber 32 is prevented from entering said sleeve and passing into the chamber 56. For preventing the atomized mixture within the lower chamber from entering the upper chamber, a deflector or hood 73, similar to the hood 71, is axially disposed beneath the opening 69 and is spaced therefrom by means of angular brackets 74 which are secured to the lower surface of the partition 39.

Within the chamber 56, the principal contact between the oil and the adsorbent is accomplished at optimum temperature under a suitable vacuum and is accompanied by atomization and steam stripping. Manifestly, the oil and adsorbent will be thoroughly admixed within the chamber 56 and any excessive moisture, oxygen, or other highly volatile substances remaining in the mixture will be removed therefrom due to the vacuum which is being drawn on said chamber. This dissipation or flashing off produces a substantially dehydrated mixture which assures coagulation of soap and other hydrated colloids and admixing thereof with the adsorbent, whereby the same will be subsequently removed with said absorbent.

From the chamber 56, the treated mixture is conducted to a pair of filter presses 75 by a pump 76 and pipe 77 which is connected in the bottom of the vessel A and which has suitable manual control valves 78 mounted therein on each side of the pump. Each press 75 is individually connected to the pipe 77 by means of a short pipe 79, which has a manual control valve 80 and pressure gauge 81 mounted therein, whereby the presses may be used simultaneously or alternately, as may be desired, for separating the oil from the adsorbent. A line 82, having communication with each press 75 by means of a manual control valve 83, conveys the treated oil to another filter press 84, then to a cooler 85 and finally to a storage tank 86. In the event it is unnecessary to pass the treated oil through the filter 84, a by-pass line 87 has been provided and is connected in the line 82 on each side of said press, whereby said oil may flow directly from the presses 75 to the cooler 85. Suitable manual control valves 88 are mounted in the line 82 for controlling the flow of oil therethrough, and are positioned between the outlet end of the press 84 and pipe 87, between said pipe and the cooler 85, and between said cooler and the storage tank 86. A similar valve 89 is also mounted in the by-pass pipe 87, while a pressure gauge 90 is mounted between one of the valves 88 and the inlet end of the press 84. If desired, a thermometer 91 may be connected in the line 82 between the tank 86 and one of the valves 88.

In operation, the oil, which is in a liquid condition, is pumped from the storage tank 10 to the mixing tank 15 by the pump 11 in accordance with the liquid level of said mixing tank, the valves and control 20 being adjusted to permit a continuous rather than an intermittent flow. If necessary, the oil is liquefied by preheating prior to its being pumped into the mixing tank. The adsorbent, which may be of any suitable material, is fed to the mixing tank by the proportional feeder 22, the quantity of the adsorbent being fed being determined by the quality of the untreated oil and the desired quality of the finished product. Due to the provision of the nozzle 17, the oil admitted to the mixing tank is caused to swirl so as to bring about a more thorough admixture of the oil and adsorbent. The pump 28 conveys the oil-adsorbent mixture by means of the pipes 27 and 31 to the chamber 32, wherein said mixture is atomized by the co-action of the nozzle 33, deflector 40 and baffle 42. Although this atomization of the mixture is primarily for the purpose of augmenting the removal of the entrained moisture, oxygen, and other highly volatile substances, by rapid dissipation or flashing off, due to the steam escaping upwardly from the pipe ring 43 and the vacuum within the chamber 32 which is drawn through the line 46, it also tends to intimately admix the oil and adsorbent. The mixture, which has been deaerated and dehydrated within the chamber 32, is then conveyed to the heater 52 by the pump 53 and conductor 54 so as to be heated to the optimum contact temperature, which is preferably between 220 degrees and 325 degrees Fahrenheit, or a higher temperature as may be required by the particular oil being treated. From the heater, the heated mixture passes through the pipe 57 and nozzle 63 into the chamber 56, whereby said mixture strikes the deflector 64 so as to be directed upwardly in a finely divided spray or mist. This action results in a further atomization of the heated mixture, which is aided by the baffle 66. Although additional undesirable substances are removed from the mixture due to the presence of upwardly flowing steam and a vacuum, this second atomization of said mixture is provided primarily for the purpose of completing the removal of oxygen, moisture, and other undesirable substances, as well as to thoroughly admix the oil and adsorbent so as to assure the removal of the undesirable constituents of the oil by said adsorbent. The heated mixture is then conveyed to the presses 75 and 84, cooler 85 and tank 86 by the pipe 77, line 82 and pump 76, as has been hereinbefore fully described.

It is pointed out that the herein described method of treating oil is a continuous operation and that it is possible to accurately determine the exact proportion of adsorbent required. It has been found that a more efficient hydrogenation of oil, treated by this method, is accomplished, which is largely due to the fact that the method permits the adsorbent to pick up and remove a greater quantity of the impurities or substances which tend to poison the catalyst used in the hydrogenation process than would be possible by conventional methods. It is well known in refinery practice that the deodorizing step sometimes improves and sometimes degrades the color of the oil. By the method herein set forth the color improvement due to deodorization is greater than that accomplished by conventional bleaching methods; thus, less color is left for any subsequent step. As an example of the economy of this method, a plant experiment on cottonseed oil showed equal decolorization by a two-tenths percent less dosage of adsorbent, which represented an improved efficiency of thirty percent. By this method, it is also possible to produce an oil of perfectly controlled uniform color from a given untreated oil.

The improved results obtained by this method are largely due to the provision of the preliminary deaerating and dehydrating action which takes place in the chamber 32 of the vessel A at a low or normal temperature. The atomization of the incoming mixture is a component part of this action and is probably the major factor contributing to the rapidity of the flashing off or dissipation of the entrained moisture, oxygen and other highly volatile substances. The secondary step of deaeration, or the intimate admixing or contacting of the mixture, is also important because it permits the further removal of the undesirable volatile substances as well as odoriferous substances. Although the chambers 32 and 56 have been described as being contained within the single vessel A, it is pointed out that said chambers could readily be formed in separate vessels without going beyond the scope of the invention. However, it is believed to be more economical to combine the chambers within one vessel, due to the fact that such arrangement effects a saving both in equipment and in space.

Although the improved method and apparatus has been described in connection with the treatment of vegetable or fatty oils, it is manifest that heavy petroleum lubricating oils or stocks may be successfully treated by this method and apparatus. In the treatment of these heavy oils, it is essential to first completely liquefy the oil prior to admixture with the adsorbent by heating to a desirable temperature, such temperature being determined by the character of said oil and usually being between 200° and 300° Fahrenheit. After the oil has been reduced to a high degree of fluidity, it is intimately admixed or commingled with the adsorbent. The adsorbent-lubricating oil mixture is then treated in exactly the same manner as has been hereinbefore described with the exception of the heating step. In the heater 52, the temperature of the mixture is elevated to the desired maximum point which will bring about optimum efficiency of contact between the adsorbent and oil. Generally, this temperature will be above 300° Fahrenheit and below 750° Fahrenheit. From the foregoing, it is obvious that by merely elevating the operating temperatures, heavy petroleum lubricating oils may be treated by the method and apparatus described herein.

When a fatty oil is treated by an activated or acid-treated adsorbent which contains a small residue of hydrolyzable acid salt, together with smaller amounts of free sulphuric acid, the preliminary low temperature deaerating, dehydrating step effects flashing off of the hydrate molecules and free moisture in the oil, and also free moisture in the adsorbent, whereby the acid constituents of said adsorbent are prevented from co-acting with the water and promoting an objectionable degree of hydrolysis of neutral fat or glycerides. Thus, the customary increase of free fatty acid due to the use of an activated or acid-treated adsorbent is obviated by the preliminary deaerating and dehydrating step.

The foregoing description of the invention is explanatory thereof and various changes in the size, shape and materials, as well as in the details of the illustrated construction, may be made, within the scope of the appended claims, without departing from the spirit of the invention.

What we claim and desire to secure by Letters Patent is:

1. A continuous process for bleaching oil with an adsorbent in finely divided state, which comprises intimately admixing the oil and adsorbent, continuously passing the mixture serially and one time only through two zones of a continuous closed system, maintaining said intimate admixture of the oil and adsorbent in said zones, subjecting the mixture as it passes through the first of said zones to deaerating conditions effective to remove air from the mixture at a temperature substantially below the effective bleaching temperature so as thereby to prevent appreciable oxidation of the oil, heating the deaerated mixture to effective bleaching temperature, subjecting said heated mixture as it passes through the second of said zones to bleaching conditions, whereby to effect bleaching of the oil in the absence of any appreciable air, and continuously withdrawing from said second zone the deaerated mixture of adsorbent and bleached oil.

2. A method according to claim 1 in which at least a portion of the elevation of temperature of the oil-adsorbent mixture is effected after passage of the mixture through the first zone of treatment but prior to introduction into the second zone of treatment.

3. In the art of bleaching a fatty oil with a bleaching adsorbent at an effective bleaching temperature above that at which substantial oxidation of the oil would occur in the presence of air, the method which comprises deaerating and dehydrating both the oil and the adsorbent by continuously feeding them in finely divided and intimately admixed state in contact with steam through a first zone under substantial vacuum and at a temperature sufficiently below effective bleaching temperature to effect deaeration of the mixture without appreciable oxidation of the oil and to effect dehydration of the mixture so as to decrease the solubility of soap therein, and thereafter bleaching the oil with the adsorbent by continuously feeding them in finely divided and intimately admixed state in contact with steam through a second zone under substantial vacuum and at an effective bleaching temperature, whereby bleaching of the oil with the adsorbent is effected in the absence of any appreciable air and thereby substantially without oxidation, and in the absence of any appreciable moisture and thereby substantially without increase in fatty acid content.

4. A method according to claim 3 in which the finely divided oil-adsorbent mixture is continuously collected after treatment in the first zone and the collected mixture is heated to an effective bleaching temperature before feeding into the second zone.

5. In the art of bleaching oil with a bleaching adsorbent at an effective bleaching temperature above that at which substantial oxidation of the oil would occur in the presence of air, the method which comprises deaerating both the oil and the adsorbent by concurrently subjecting them in finely divided state to a substantial vacuum in a zone at a temperature sufficiently below effective bleaching temperature to effect the deaeration of both the oil and the adsorbent without appreciable oxidation of the oil, and thereafter bleaching the oil with the adsorbent by continuously feeding them in finely divided and intimately admixed state in contact with steam through a second zone under substantial vacuum and at an effective bleaching temperature, whereby bleaching of the oil with the adsorbent is effected in the absence of any appreciable air carried by either the oil or the adsorbent.

6. A method according to claim 5 in which the oil and adsorbent are admixed prior to said deaeration thereof.

7. A continuous method for bleaching oil with an adsorbent in finely divided state, which comprises forming an intimate admixture of the oil and adsorbent, deaerating the oil and adsorbent, at a temperature substantially below the effective bleaching temperature, by continuously passing said mixture through a zone maintained under substantial vacuum while effecting extensive surface area exposure of the mixture to the vacuum in said zone, thereby to remove air from the oil and adsorbent and prevent any appreciable oxidation of the oil, continuously withdrawing the deaerated mixture from said zone and heating the deaerated mixture to effective bleaching temperature, continuously passing the heated oil and adsorbent in intimate admixture with each other through a second zone under vacuum so as to bleach the oil in the absence of appreciable oxygen, and continuously withdrawing the mixture of adsorbent and bleached oil from said second zone.

8. A method according to claim 7 in which the exposure of extensive surface area of the oil and adsorbent in said first treatment zone is effected by finely subdividing the admixture of the oil and adsorbent.

9. A method according to claim 7 in which the oil-adsorbent admixture is in a finely subdivided state in the bleaching treatment in said second zone.

10. The method of bleaching oil with the use of a bleaching adsorbent, which method comprises deaerating and dehydrating both the oil and the adsorbent by subjecting them in a state characterized by extensive surface area exposure to a substantial vacuum at a temperature substantially below effective bleaching temperature to effect the deaeration and dehydration, and thereafter bleaching the oil with the adsorbent by continuously feeding them in finely divided and intimately admixed state in contact with steam through a zone under substantial vacuum and at an effective bleaching temperature, whereby bleaching of the oil with the adsorbent is effected in the absence of any appreciable air or moisture carried by either the oil or the adsorbent.

11. The method of treating oil with an adsorbent, which method comprises delivering the oil in a stream with adsorbent carried in suspension in a downward direction into a zone under substantial vacuum, splattering said stream to finely divide the oil and suspended adsorbent in the form of a spray, and passing steam through the spray in an upward direction.

12. A process for bleaching oil with an adsorbent in finely divided state, including the steps of intimately admixing the oil and adsorbent, introducing the mixture into the upper part of a deaerating zone maintained under substantial vacuum and at a temperature substantially below effective bleaching temperature, splattering the discharged mixture to finely divide the oil and adsorbent in the form of a spray so as to provide for rapid removal of air from the oil and the adsorbent, and thereafter bleaching the oil with the adsorbent by feeding them through a second zone under substantial vacuum and at an effective bleaching temperature, whereby bleaching of the oil with the adsorbent is effected in the absence of any appreciable air carried by either the oil or the adsorbent.

13. Oil bleaching equipment comprising a treatment vessel having a chamber therein with a connection for applying vacuum adjacent the top thereof and an inlet for steam adjacent the bottom thereof, means for delivering a stream of oil carrying adsorbent in suspension in a downward direction into the chamber in a zone intermediate the vacuum connection and the steam inlet, a baffle plate in the path of said stream adapted to finely divide the mixture introduced in said stream in the form of a spray and to deflect the spray toward the side walls of the chamber, and an annular baffle projecting inwardly from the side walls of the chamber at least in part below the level of said baffle plate but above the steam inlet to cause the oil-adsorbent mixture collected on the walls above the annular baffle to flow over the inner edge of the baffle and descend in space in the chamber toward the steam inlet.

14. Apparatus for bleaching oil with an adsorbent in finely divided form comprising in combination, a mixing chamber having means for forming an intimate admixture of oil and adsorbent, means for feeding the oil and the adsorbent to said chamber, a deaerating chamber, means for delivering the mixed oil and adsorbent in finely divided form in an upper portion of said deaerating chamber to descend therein, means for delivering steam into a lower portion of the deaerating chamber to rise therein, means connected to an upper part of the deaerating chamber for placing said chamber under vacuum and for withdrawing vapors therefrom, a heater, means for leading the treated oil-adsorbent mixture collecting in the deaerating chamber to said heater, an oil bleaching chamber, means for delivering the heated mixture to an upper portion of said bleaching chamber in finely divided form to descend therein, means for delivering steam to a lower portion of the bleaching chamber to rise therein, means connected to an upper part of the bleaching chamber for placing said chamber under vacuum and for withdrawing vapors therefrom, a filter, and means for delivering the mixture of oil and adsorbent collecting in said bleaching chamber to said filter.

15. Apparatus for bleaching oil with an adsorbent in finely divided form comprising in combination, a mixing chamber having means for forming an intimate admixture of oil and adsorbent, means for feeding the oil and the adsorbent to said chamber, a deaerating chamber, a spray device for delivering the mixed oil and adsorbent in finely divided form in an upper portion of said deaerating chamber to descend therein, a steam inlet in a lower portion of the deaerating chamber providing for the rise of steam therein, a vacuum pipe connected to an upper part of the deaerating chamber for placing said chamber under vacuum and for withdrawing vapors therefrom, a heater, a pipe connection for leading the treated oil-adsorbent mixture collecting in the deaerating chamber to said heater, an oil bleaching chamber, a spray device for delivering the heated mixture to an upper portion of said bleaching chamber in finely divided form to descend therein, a steam inlet in a lower portion of the bleaching chamber providing for the rise of steam therein, and a vacuum pipe connected to an upper part of the bleaching chamber for placing said chamber under vacuum and for withdrawing vapors therefrom.

ROBERT R. KING.
SAMUEL E. PACK.
FLOYD W. WHARTON.

REFERENCES CITED

The following references are of record in the file of this patent:

UNITED STATES PATENTS

| Number | Name | Date |
| --- | --- | --- |
| 1,866,591 | Baylis | July 12, 1932 |
| 2,280,896 | Dean | Apr. 28, 1942 |
| 2,122,260 | Moore | June 28, 1938 |
| 1,771,561 | Gensecke | July 29, 1930 |
| 1,754,598 | Bollmann | Apr. 15, 1930 |
| 1,274,175 | Lowenstein | July 30, 1918 |

FOREIGN PATENTS

| Number | Country | Date |
| --- | --- | --- |
| 22,086 | Great Britain | 1903 |
| 16,954 | Great Britain | 1892 |